US012713138B2

(12) United States Patent
Perugini et al.

(10) Patent No.: US 12,713,138 B2
(45) Date of Patent: Aug. 18, 2026

(54) OPTICAL SCANNER AND IMAGE-ACQUISITION METHOD PERFORMED THEREWITH

(71) Applicant: Datalogic IP Tech S.r.l., Bologna (IT)

(72) Inventors: Luca Perugini, Bologna (IT); Simone Spolzino, Bologna (IT)

(73) Assignee: Datalogic IP Tech S.r.l., Bologna (IT)

( * ) Notice: Subject to any disclaimer, the term of this patent is extended or adjusted under 35 U.S.C. 154(b) by 55 days.

(21) Appl. No.: 18/756,424

(22) Filed: Jun. 27, 2024

(65) Prior Publication Data

US 2026/0006338 A1 Jan. 1, 2026

(51) Int. Cl.

| | |
|---|---|
| ***H04N 23/73*** | (2023.01) |
| ***G06K 7/10*** | (2006.01) |
| ***G06K 7/14*** | (2006.01) |
| ***G06V 10/25*** | (2022.01) |
| ***H04N 23/74*** | (2023.01) |

(52) U.S. Cl.

CPC ............ *H04N 23/73* (2023.01); *G06V 10/25* (2022.01); *H04N 23/74* (2023.01)

(58) Field of Classification Search

CPC ......... H04N 23/73; H04N 23/74; G06V 10/25

See application file for complete search history.

(56) References Cited

U.S. PATENT DOCUMENTS

| | | | |
|---|---|---|---|
| 2010/0147947 A1 | 6/2010 | Aker et al. | |
| 2011/0101102 A1 | 5/2011 | Hussey et al. | |
| 2012/0193431 A1 | 8/2012 | Hawley et al. | |
| 2021/0103712 A1 | 4/2021 | He | |
| 2022/0139060 A1 | 5/2022 | Canini et al. | |
| 2022/0187459 A1* | 6/2022 | Perugini | G01S 17/42 |
| 2024/0161274 A1* | 5/2024 | Xue | G06V 10/25 |

OTHER PUBLICATIONS

Extended European Search Report for European Application No. 25185370.1-1201, dated Nov. 7, 2025, 7 pages.

* cited by examiner

*Primary Examiner* — Ahmed A Berhan

(74) *Attorney, Agent, or Firm* — Cozen O'Connor

(57) ABSTRACT

An image-acquisition method includes capturing, with an image sensor that includes a pixel array, a first image-set of a scene illuminated by an aimer-pattern. Each image of the first image-set includes a respective image-region detected by a plurality of pixels of the pixel array that define an aimer-illuminated region of the pixel array that at least in part determines a region-of-interest (ROI) of the pixel array. The method also includes determining an ROI exposure-setting based on ROI pixel-values of the first image-set generated by the ROI of the pixel array. The method also includes capturing a second image-set of the scene while the exposure setting of pixels of the aimer-illuminated region equals the ROI exposure-setting.

20 Claims, 8 Drawing Sheets

OPTICAL SCANNER AND IMAGE-ACQUISITION METHOD PERFORMED THEREWITH

BACKGROUND

In machine-readable symbol readers (e.g., barcode readers), an aimer element is usually present to help the user orient a field-of-view (FOV) of the machine-readable reader with respect to a machine-readable symbol that has to be acquired and decoded. This aimer can be realized with different techniques (laser dot or cross, LED circle, etc.) and it usually identifies the area of greatest interest inside an image to be decoded.

An efficient auto-exposure algorithm is a critical component for reader snappiness and motion tolerance. In a typical application, the auto-exposure works on a fixed region of interest (ROI), which may be a rectangle centered in the image. The auto-exposure algorithm analyzes the brightness inside the region to match it to a predefined luminance target.

Depending on reader characteristics and application, this fixed ROI does not always represent the most significant portion of the image, that is, the portion that includes the machine-readable symbol (e.g., one-dimensional barcode symbol; two dimensional area, matrix or QR code symbol).

Aimer position is a useful indication of the significant portion of the image, as the user typically aligns it on the machine-readable symbol to be read, e.g., when the symbol reader is handheld or a kiosk reader. Due to mechanical characteristics of the reader, this aimer is not always centered in the image. Rather, its position can change with target distance due to mechanical offsets between it and the receiver optics.

In autofocus based systems with laser triangulation for calculating target distance, aimer position changing with target distance is a system requirement. In such systems, at close distances the aimer changes its position inside the image toward the edge. Keeping the auto-exposure ROI fixed is not optimal because the machine-readable symbol will be outside it when the distance changes. In complex scenes with bright areas such as windows, having the ROI outside the machine-readable symbol can lead to underexposed or overexposed machine-readable symbols.

SUMMARY OF THE EMBODIMENTS

Embodiments disclosed herein resolve this problem linking the auto-exposure ROI position and size to the current aimer position inside the image. When target distance is not derived by means of an aimer, but a target distance measure is available by other means (such as a time-of-flight sensor), this information may be used to link the ROI size and position instead.

Embodiments disclosed herein improve system reliability by providing a more accurate auto-exposure luminance target for the area including the machine-readable symbol while not significantly degrading the exposure convergence speed. In systems where aimer position or target distance is already present for features such as autofocus or pick-list selection, the ROI position and size may be changed one frame after the information is available. When this information is not available, the delay is related to the time required to expose the aimer inside the image and localize it (typically 2-3 frames).

The advantage with respect to a fixed auto-exposure ROI position is evident in complex scenes with lights or windows that have different brightness close to the machine-readable symbol position. For short distances, packages that have dark areas and light areas side to side can benefit for a more precise ROI.

In a first aspect, an image-acquisition method is disclosed. The image-acquisition method includes capturing, with an image sensor that includes a pixel array, a first image-set of a scene illuminated by an aimer-pattern. Each image of the first image-set includes a respective image-region detected by a plurality of pixels of the pixel array that define an aimer-illuminated region of the pixel array that at least in part determines a region-of-interest (ROI) of the pixel array. The method also includes determining an ROI exposure-setting based on ROI pixel-values of the first image-set generated by the ROI of the pixel array. The method also includes capturing a second image-set of the scene while the exposure setting of pixels of the aimer-illuminated region equals the ROI exposure-setting.

In a second aspect, an optical scanner is disclosed. The optical scanner includes an image sensor, a light emitter, and circuitry. The image sensor includes a pixel array. The circuitry is communicatively coupled to the pixel array and operates with the pixel array to image a scene illuminated by the light emitter by executing the method of the first aspect.

DETAILED DESCRIPTION OF THE EMBODIMENTS

Figure 1:
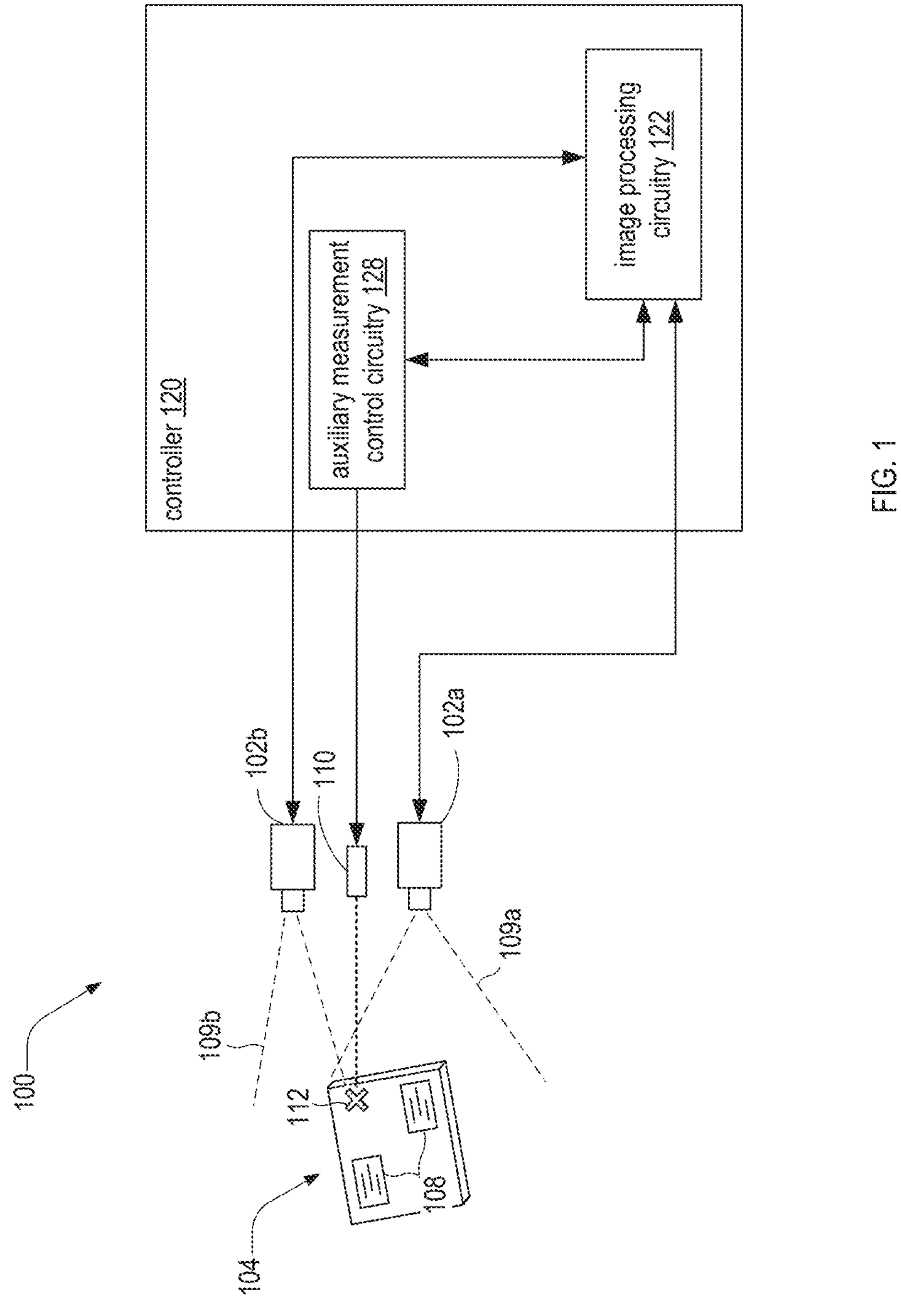
FIG. 1 is a simplified block diagram illustrating an implementation of a scanning system according to at least one example embodiment.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all acts necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Some aspects of the present disclosure provide an image-based optical scanning system having multiple image-capture devices. FIG. 1 is a simplified block diagram illustrating an implementation of a scanning system 100, according to at least one example. As discussed further below, the scanning system 100 may be employed to capture multiple images of a subject 104, such as a machine-readable symbol or set of symbols 108 (e.g., 1D barcode symbol, 2D area, matrix or QR code symbol, image-encoded information such as a digital watermark, printed characters or text). Subject 104 may itself be a machine-detectable or machine-recognizable object. Scanning system 100 may read, recognize, detect, or perform other automated analytical processing of the subject. For the sake of brevity, operations such as these will be referred to in the present context as "reading."

Aspects of the disclosure may likewise be used in other areas of automated vision, such as automated guided vehicles (AGVs), robotics, automated driving, and machine-vision (MV) systems. The embodiments described below are in the context of visual symbol-reading, but principles of the present technologies relating to ranging and calibration are likewise applicable in a multitude of other areas.

Scanning system 100 includes one or more image-capture devices. In the depicted example, system 100 includes two image-capture devices 102*a*-102*b* (collectively, image-capture devices 102). It will be understood that related embodiments may have just one image-capture device, or three or more image-capture devices. Each image-capture device 102 may include an image sensor that is constructed and operative to produce signals representing images or video frames. In the present context, the terms "image" and "video frame" may be used interchangeably to refer to a fixed image or portion thereof, with any distinctions intended between the two data types specifically called out if pertinent.

Each image-capture device 102 may be assembled together with optical components, such as an objective, microlens array, or the like. In other examples, more than one individual image-capture device may share a common optical system. Image-capture devices 102*a*-102*b* may be constructed using any suitable technology, whether known or arising in the future. Without limitation, some examples include complementary metal-oxide semiconductor (CMOS)-based sensors, charge-coupled device (CCD)-based sensors, sensors optimized for the visible spectrum, sensors optimized for infrared or near-infrared frequencies, high-dynamic-range (HDR) sensors, monochrome sensors, color sensors, Quanta Image Sensors, Hyperspectral sensors, Polarized sensors, Image sensors embedding AI capabilities, or the like. In related implementations, the set of image-capture devices 102 that are employed in scanning system 100 include sensors of diverse types, such as a grouping that includes conventional image sensor and an HDR image sensor, for example.

As shown in the example of FIG. 1, image-capture devices 102*a* and 102*b* have respective fields of view 109*a* and 109*b*. In related examples, various image-capture devices 102 have different optical characteristics. For instance, image-capture device 102*a* may be a near-field camera, whereas image-capture device 102*b* may be a far-field camera. In other examples, image-capture devices 102 have the same optical characteristics. As another useful feature in some embodiments, image-capture devices 102 are situated in a specific spaced relationship with one another.

Scanning system 100 further includes one or more aimer transmitters. In the example depicted, a single aimer transmitter 110 is shown, which may be a laser emitter, a light source with a lens system for shaping the emitted beam, or the like. Aimer transmitter 110 illuminates subject 104 with an aimer-pattern 112.

It will be understood that in other embodiments, multiple aimer transmitters may be employed. A configuration where multiple aimer transmitters 110 may be appropriate is in a system with only one image sensor. In the example as shown, aimer transmitter 110 is situated at a fixed position relative to image-capture devices 102*a*-102*b*. As will be discussed in greater detail below, in some embodiments, the positional offset between each image-capture device 102 and aimer transmitter 110 facilitates determination of ranging to the target surface using a triangulation technique.

Image-capture devices 102 and aimer transmitter 110 are interfaced with controller 120, which includes auxiliary measurement control circuitry 128 and image processing circuitry 122. In some embodiments, each image-capture device 102 and aimer transmitter 110 may be communicatively coupled to controller 120 through a wired or wireless medium. In a related embodiment, a network (e.g., LAN, WAN, PAN, Internet) may facilitate the communicative coupling. In some embodiments, the image-capture device 102 may be connected directly to controller 120 through a suitable local interface (e.g., $I^2C$, USB, SPI, UART, $I^3C$) or may be integrated with controller 120 and interconnected using an internal interconnect such as a suitable variant of a peripheral component interconnect (PCI), serial AT Attachment (SATA), mobile industry processor interface (MIPI), or other interconnects known by those skilled in the art.

Auxiliary measurement control circuitry 128 is operative in concert with image processing circuitry 122 to coordinate the operation of aimer transmitter 110 and image-capture devices 102*a*-102*b* to measure the ranging to a target surface of subject 104. Image-capture devices 102 are communicatively coupled to image processing circuitry 122, which is configured to receive the captured images and perform the processing operations for determining the ranging, setting operational parameters to facilitate image capture of subject 104 based on the ranging, and capture the images of subject 104 to perform reading of subject 104.

For determining the ranging, image processing circuitry 122 is coupled to auxiliary measurement control circuitry 128 so that the two may exchange relevant data and commands. For instance, image sensor frame capture signaling may be supplied by image processing circuitry 122 to auxiliary measurement control circuitry 128, so that the latter may adjust the activation of the aimer transmitter's patter (e.g., spot, line, cross, triangle or other shape) within frames of the captured images.

Figure 2:
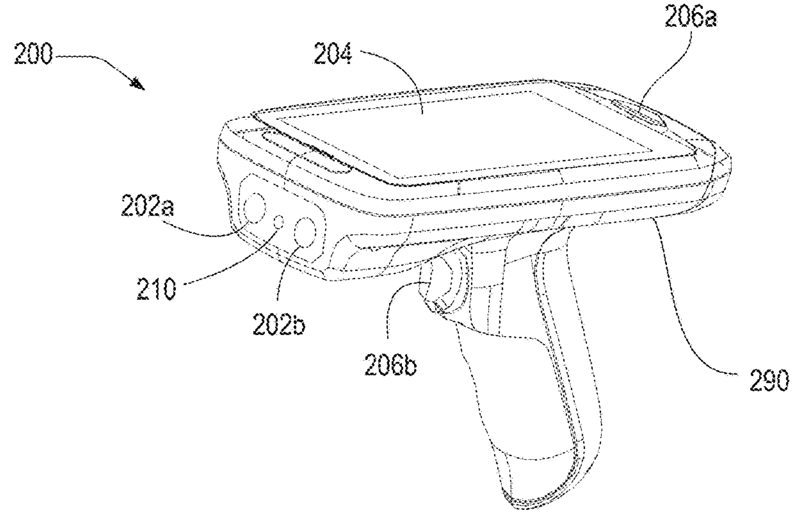
FIG. 2 is a diagram illustrating handheld reader as one example implementation of a scanning system.

FIG. 2 is a diagram illustrating handheld reader 200 as one example implementation of scanning system 100. Handheld reader 200 includes at least one of forward-facing cameras 202*a* and 202*b*, which may be positioned in a spaced-apart relationship so as to have partially overlapping fields of view. Cameras 202*a* and 202*b* are respective examples of image-capture devices 102*a* and 102*b*. Handheld reader 200 may also include a forward-facing aimer transmitter 210, which is an example of aimer transmitter 110. Handheld reader 200 may also include at least one of a housing 290, display 204, and pushbutton controls 206*a* and 206*b*.

Aimer transmitter 210 facilitates ranging to subject 104. Aimer transmitter 210 may work in concert with one or all of cameras 202*a*, 202*b* according to a triangulation technique in which a position of the aimer spot within the field of view of one or both of the cameras is indicative of the distance to the subject. The ranging measurements may be used as input (among other inputs) to determine operational parameters such as selection of image sensor for subsequent information processing, focus setting, illumination power, and other settings.

According to other embodiments, a reader may be mounted to a stationary or mobile structure. Examples of mounting locations for various scanning applications include vehicles, doorways, ramps, conveyors, buildings, robots, or the like. In mounted implementations, the cameras may have their own respective housings, which may be separate from the image processing system hardware.

Figure 3:
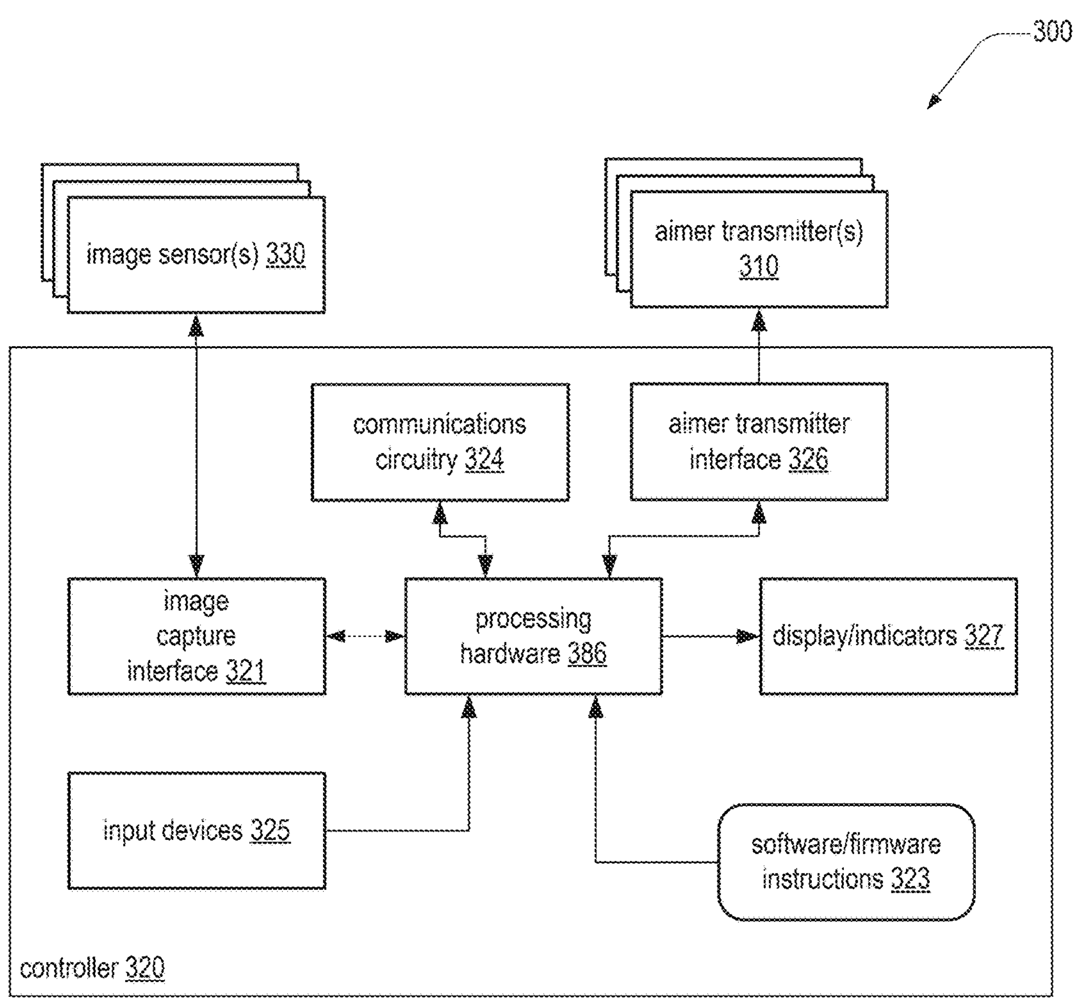
FIG. 3 is a high-level block diagram illustrating an example system architecture of the scanning system of FIG. 1, according to some embodiments.

FIG. 3 is a block diagram illustrating an example system architecture 300 of scanning system 100. System architecture 300 includes a controller 320, which is an example of controller 120. Controller 320 includes processing hardware 386 operatively coupled to image capture interface 321, input devices 325, display or indicators 327, communications circuitry 324, and aimer transmitter interface 326. Processing hardware 386 includes one or more processor circuits that execute software or firmware instructions 323, with the latter being stored in a non-transitory machine-readable medium such as a read-only memory, flash memory, random-access memory, or the like.

Controller 320 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), Complex Programmable Logic Device (CPLD), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Image capture interface 321 includes circuitry facilitating the exchange of data between processing hardware 386 and one or more image sensor(s) 330. At least one of image-capture devices 102 and cameras 202 may include an image sensor 330.

In some examples, image capture interface 321 includes data buffers, video decoders, video encoders, address and data bus interfaces, serial data receiver/transmitter circuitry, analog-to-digital (A/D) converter circuitry, and the like. The data communications portions of image capture interface 321 may facilitate wired or wireless communication. Image capture interface 321 is operative to pass video frames from their original format as output by each of image sensors 330 to processing hardware 386 in a suitable data format to be read by processing hardware 386. Image capture interface 321 and processing hardware 386 may work in concert to implement image processing circuitry 122 (FIG. 1).

In a related example, image capture interface 321 may additionally be configured to pass information from processing hardware 386 to one or more of image sensors 330. This upstream information may include configuration commands such as sensor gain settings, frame rate, exposure control, activation/deactivation commands, etc.

In some embodiments, image capture interface 321 may be integrated as part of a digital signal processor (DSP) device or microcontroller device. In other embodiments, image capture interface 321 may be integrated as part of one or more image sensors 330.

Aimer transmitter interface 326 includes circuitry to control the operation of one or more aimer transmitter(s) 310. Aimer transmitter interface 326 may include current regulator circuitry, switching circuitry, or the like. Each aimer transmitter 310 may include a solid-state laser emitter having a wavelength that is within the light-detection range of image sensors 330. In other implementations, each aimer transmitter 310 may include another type of light source, e.g., visible or infrared diode and a lens system to shape the emitted light into a spot or other pattern to be projected onto the target surface. Aimer transmitter interface 326, and processing hardware 386 may work in concert to implement auxiliary measurement control circuitry 128 (FIG. 1).

Input devices 325 include user-operable controls, such as pushbuttons, keypad, touchscreen, and the like, as well as additional sensors, such as a ranging sensor, motion sensor, accelerometer, etc. Display or indicators 327 include devices such as a liquid-crystal display (LCD), LED indicators, speaker or buzzer, and other suitable output devices.

Communications circuitry 324 includes wired or wireless communications facilities that provide input and output to and from processing hardware 386. Communication circuitry may include one or more of the following types of communication circuits: universal serial bus (USB), CAN, $I^2C$, SPI, UART, $I^3C$, Ethernet, personal-area network such as Bluetooth according to an IEEE 802.15 standard, Wi-Fi according to an IEEE 802.11 standard, or the like.

Figure 4A:
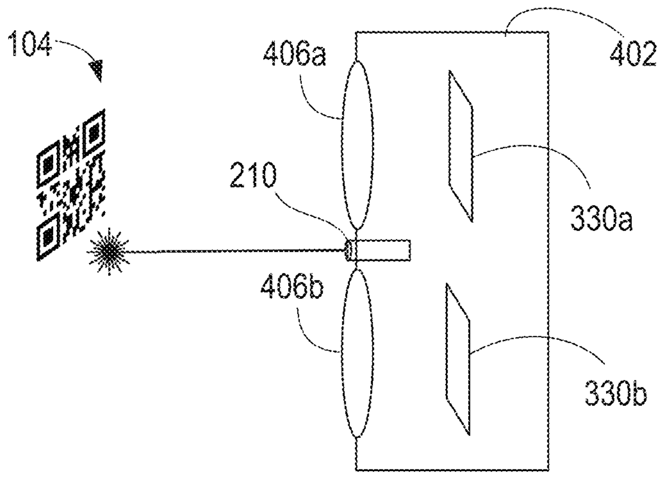
FIGS. 4A-4D are simplified schematic diagrams that illustrate arrangements that may be employed as examples of one or more image-capture devices.
Figure 4B:
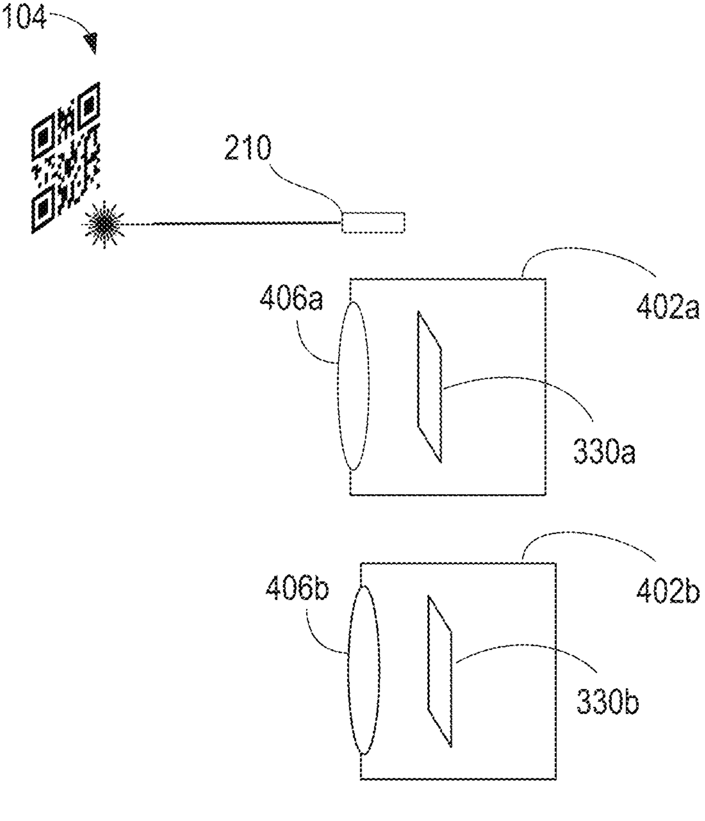

FIGS. 4A-4D are simplified schematic diagrams that illustrate arrangements that may be employed as examples of one or more image-capture devices such as image-capture devices 102. FIG. 4A illustrates an example arrangement consistent with handheld reader 200 described above with reference to FIG. 2. A single enclosure 402 houses image sensors 330*a* and 330*b*, each arranged with a corresponding objective 406*a* and 406*b*. Aimer transmitter 210 is also shown. As described above, aimer transmitter 210 may be used to place a spot on a surface containing subject 104, and video frames captured by image sensors 330*a* and 330*b* may be evaluated to determine the ranging to subject 104. FIG. 4B illustrates an example with separate enclosures, 402*a* and 402*b*, each having a corresponding image sensor 330*a*, 330*b* and objective 406*a*, 406*b*. Aimer transmitter 210 may be situated independently from either enclosure 402*a* or 402*b*, or it may be situated in one of the enclosures 402*a* or 402*b*.

Figure 4C:
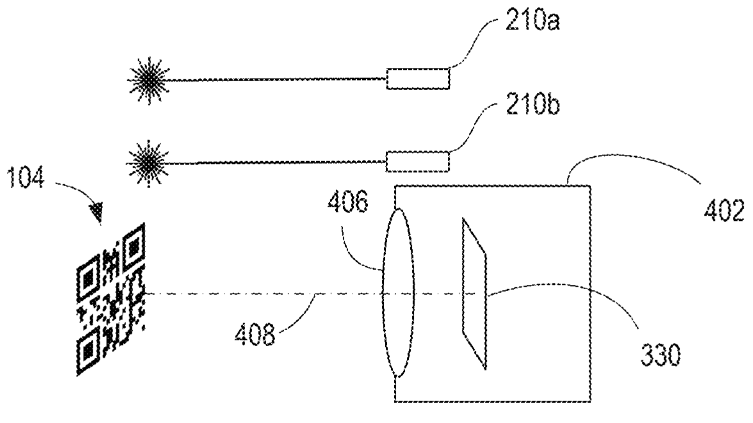
Figure 4D:
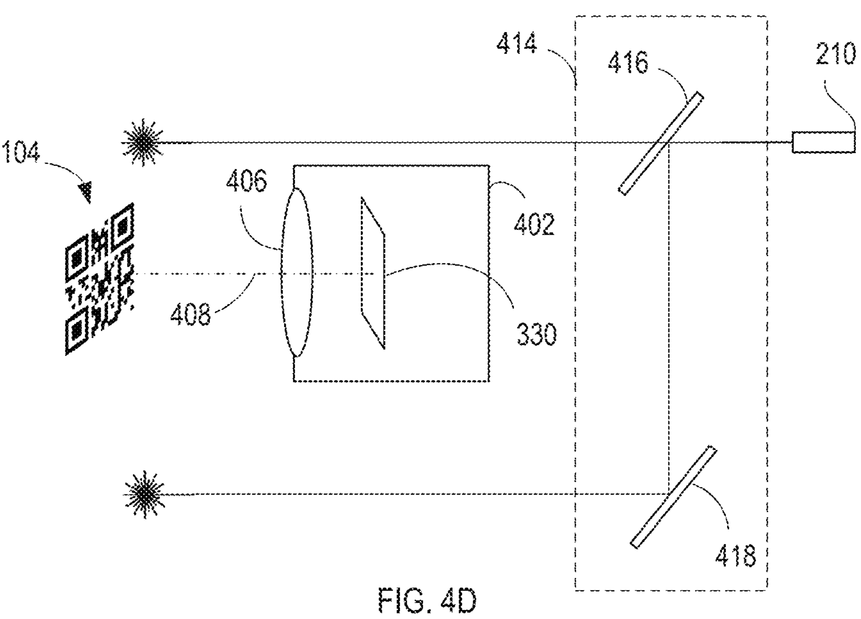

FIGS. 4C and 4D illustrate another set of examples in which a single image sensor 330 is provided in enclosure 402 and arranged with single objective 406 have an optical axis 408. To facilitate triangulation with these single-image-sensor arrangements, multiple aimer spots are utilized. In the example of FIG. 4C, a first aimer transmitter 210*a* and a second aimer transmitter 210*b* are arranged in a spaced-apart relationship with respect to one another, and with respect to image sensor 330. In the example of FIG. 4D, a single aimer transmitter 210 is provided. To achieve multiple spots or other pattern(s), optical system 414 is provided. In one example, as shown, optical system 414 includes beam splitter 416 and mirror 418.

In some embodiments of the arrangements of FIGS. 4C and 4D, as depicted, each aimer beam may be situated at a different distance from the centerline of image sensor 330. In related embodiments, the aimer beams are parallel.

In still other embodiments, the aimer beams are not parallel. For example, they may be arranged to diverge from one another with increasing distance from image sensor 330. In one type of embodiment, the aimer beams are arranged to diverge at an angle such that the aimer spots maintain the same distance from one another as captured in the images by image sensor 330, regardless of distance.

Figure 5:
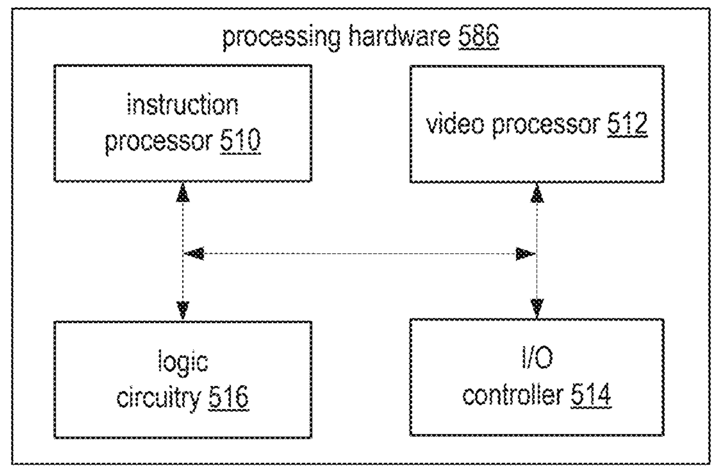
FIG. 5 is a simplified block diagram illustrating a portion of processing hardware of a controller of the scanning system of FIG. 1, according to one example.

FIG. 5 is a simplified block diagram processing hardware 586, which is an example of processing hardware 386. Processing hardware 586 includes instruction processor 510, video processor 512, and input/output (I/O) controller 514. Instruction processor 510 is constructed to execute software or firmware instructions 323, the execution of which causes instruction processor 510 to implement engines to carry out the overall functionality of scanning system 100 in conjunction with the other components of controller 120, image sensors 330, and aimer transmitter 310 as shown in FIG. 3. For instance, instruction processor 510 may reads input devices 325 and take actions in response to those inputs; instruction processor 510 may write output to display or indicators 327; and instruction processor 510 may exchange data with communications circuitry 324 to send and receive data to or from other devices. In addition, instructions 323, when executed by instruction processor 510, may causes instruction processor 510 to carry out triangulation and calibration operations to determine ranging to the subject as described in greater detail below in accordance with some embodiments.

Instruction processor 510 may be of any suitable architecture. As an example, instruction processor 510 may include a central processing unit (CPU) core, RAM, non-volatile memory, memory controllers, address and data (or shared) busses, serial communications ports such as a universal synchronous receiver/transmitter (UART), and peripheral circuitry such as timers, event counters, A/D or D/A converters, pulse-width modulation (PWM) generator, etc.

Video processor 512 is interfaced with instruction processor 510, and implements engines to receive captured images from image-capture devices 102, and to resample, crop, compress, or combine portions of images, filter, evaluate visual characteristics of the captured images, determine the location of captured visual elements within the image frame (such as the location of the aimer spot produced by aimer transmitter 210), and perform symbol reading or object detection algorithms. In some embodiments, video processor 512 includes a digital signal processor (DSP) core having a computing architecture that is optimized for video processing and including additional or specialized arithmetic logic units (ALUs)—direct-memory access, fixed-point arithmetic, etc., ASIC, FPGA, CPLD, or combination thereof.

I/O controller 514 includes circuitry that facilitates addressing, data transfer, memory access, and other interactions between instruction processor 510, video processor 512, and the other components of controller 120. As examples, I/O controller 514 may include a bus or system interconnect controller, a serial communications hub controller, or the like.

In related embodiments, instruction processor 510 and video processor 512 are integrated as a single processing device, such as a digital signal controller (DSC) that is configured to perform the respective functionality of instruction processor 510 and video processor 512 described above. Similarly, I/O controller 514 may also be integrated as part of a DSC implementation. In other related embodiments, some portion of processing hardware 386 may be implemented with logic circuitry 516, such as an application-specific integrated circuit (ASIC), FPGA, CPLD, hardware coprocessor, or the like. Logic circuitry 516 may be utilized to perform certain operations with greater speed or power efficiency than can be conventionally achieved using an instruction processor, such as image filtering, image frame combining, triangulation, or the like.

Figure 6:
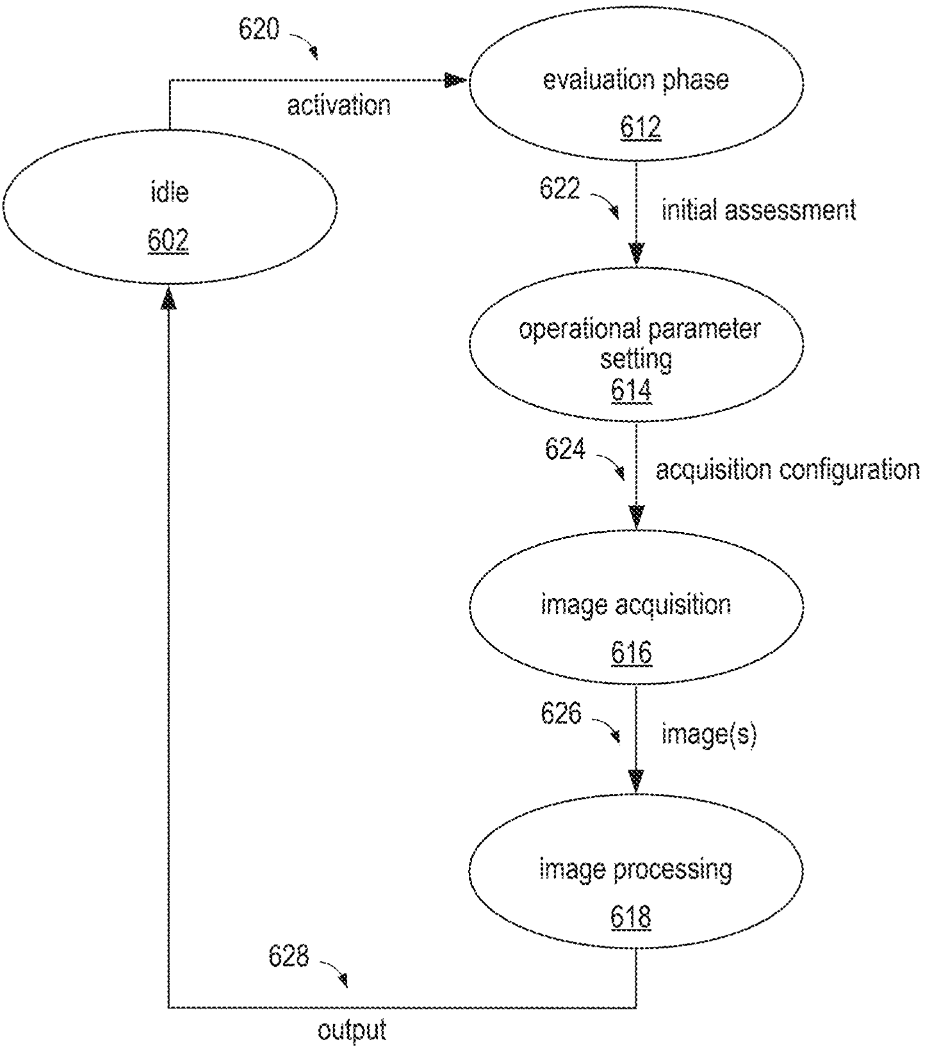
FIG. 6 is a high-level state diagram illustrating a simplified operational regime of a controller of a scanning system according to an example embodiment.

FIG. 6 is a high-level state diagram illustrating a simplified operational regime of controller 120 according to an example embodiment. The states include idle 602, evaluation phase 612, operational parameter setting 614, image acquisition 616, and image processing 618. Evaluation phase 612 is started in response to an activation event 620. In the example of a hand-triggered reader such as handheld reader 200, the activation event may be actuation of a pushbutton.

Evaluation phase 612 involves rapidly performing one or more initial measurements, such as a distance measurement, lighting conditions measurement, or other such measurement, to determine the mode of operation for image acquisition. In the case of distance measurement, the ranging to the subject may be determined using aimer transmitter 110 and auxiliary measurement control circuitry 128 and image processing circuitry 122 to produce a ranging measurement as part of generating initial assessment data 622. In some embodiments, the speed of evaluation phase 612 is maximized to provide minimal operational latency. As an example, evaluation phase 612 may be performed using a subset of the image frames in order to reduce the extent of image processing required to output initial assessment data 622.

Operational parameter setting 614 uses initial assessment data 622 to set operational parameters such as selection of camera or image sensor, focus setting, exposure setting, image-sensor gain setting, active illumination (e.g., flash or light) setting, active illumination source selection (in embodiments utilizing multiple active illumination sources), or the like. Operational parameter setting 614 produces acquisition configuration data 624, which may include a command set the focus, activate a flash or light, select of a region of interest (ROI), or any combination of these and other available settings. Image acquisition 616 involves activating or reading the selected image sensor according to the applicable operational parameters to capture one or a series of images 626. For example, the best image sensor may be selected, along with various settings for that image sensor, such as gain, exposure, etc.

Image processing 618 is generally performed on one or more captured images 626 resulting from operation of acquisition phase 616. Image processing operations 618 include reading of the subject (e.g., symbol reading, text recognition, object detection, object recognition, etc.). Image processing 618 is a more computationally expensive process than the initial assessment operations that are performed as part of evaluation phase 612 and image acquisition phase 616. The result of image processing 618 is output 628, which may be in the form of a data object indicating the data of a machine-readable symbol, recognized text or object, etc.

Figure 7:
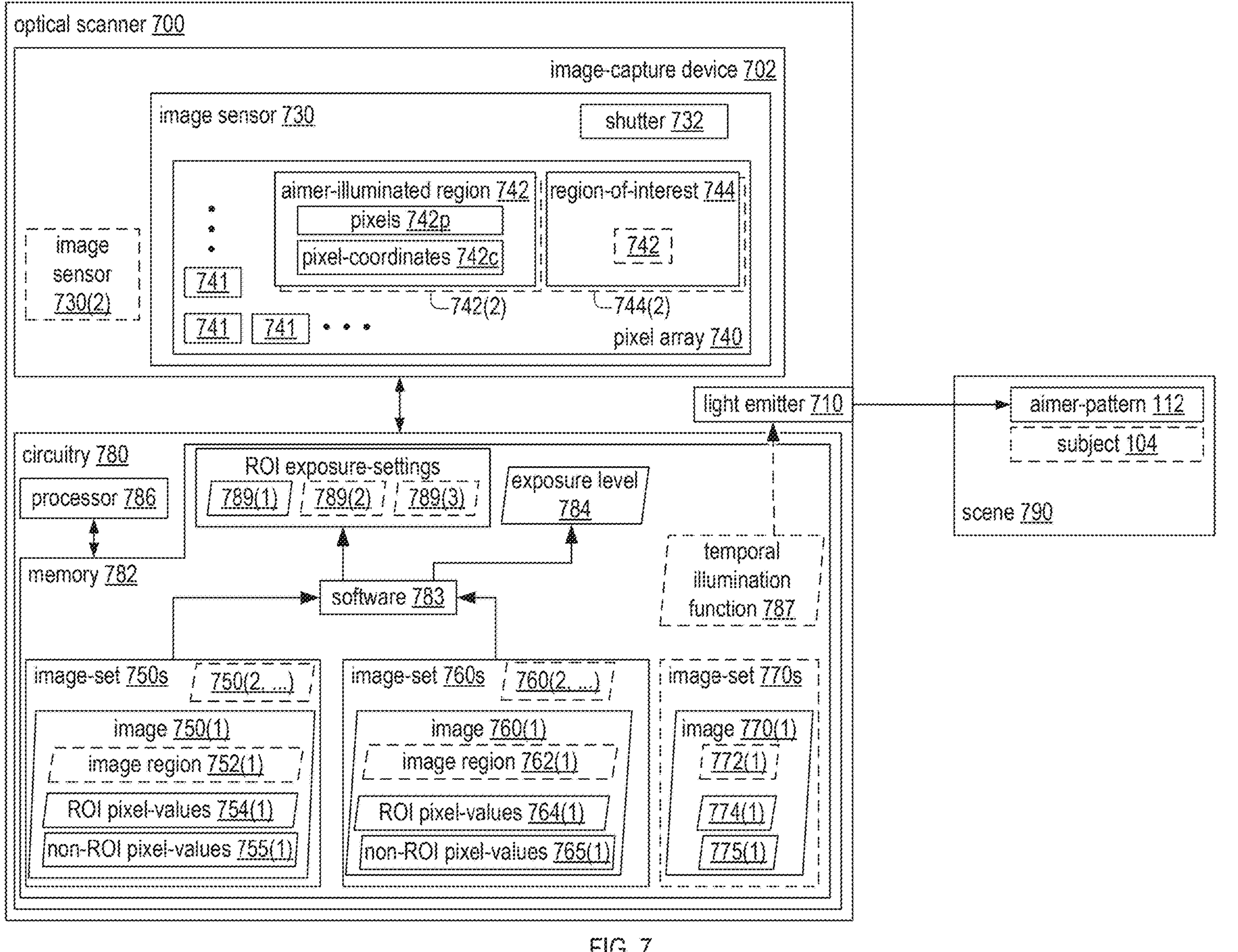
FIG. 7 is a functional block diagram of an embodiment of an optical scanner, examples of which include the scanning system of FIG. 1.

FIG. 7 is a functional block diagram of an optical scanner 700, examples of which include scanning system 100. Optical scanner 700 includes an image sensor 730, a light emitter 710, and circuitry 780, examples of which are image sensor 330, aimer transmitter 110, and controller 120, respectively. Image sensor 730 may be part of an image-capture device 702 of optical scanner 700, which may include one or more cameras, such as an image-capture device 102 or a camera 202. Image-capture device 702 may include an additional image sensor 730, shown as image sensor 730(2) in FIG. 7.

FIG. 7 depicts a scene 790 in a field of view of image-capture device 702. Scene 790 includes subject 104 and aimer-pattern 112 produced by light emitter 710. Light emitter 710 may intermittently produce aimer-pattern 112, according to a temporal illumination function 787 stored in memory 782 for example, such that scene 790 intermittently includes aimer-pattern 112. Examples of the temporal illumination function 787 include a square waveform or a rectangular waveform.

Image sensor 730 includes a pixel array 740 and may include a shutter 732. Pixel array 740 includes a plurality of pixels 741. FIG. 7 denotes an aimer-illuminated region 742 of pixel array 740. Aimer-illuminated region 742 includes pixels **742*p* each having a respective pixel-coordinate 742C. Each pixel 742*p* is a pixel 741 within aimer-illuminated region 742. In embodiments, pixel-coordinates 742*c* are contiguous, such that pixels 742*p* are a plurality of contiguous pixels 741**.

Aimer-illuminated region 742 at least in part determines a region-of-interest 744 (hereinafter ROI 744) of pixel array 740. ROI 744 includes a plurality of pixels 741, which may be or include a contiguous plurality of pixels 741. Aimer-illuminated region 742 and ROI 744 respectively occupy a first area and a second area of the pixel array 740, which each area is defined by a plurality of pixels 741 each having a respective pixel coordinate. The second area may be larger than the first area. The first area may be an m×n array of pixels, where each of integers m and n may be between 2 and one hundred. The second area may be an p×q array of pixels, where each of integers p and q may be between 128 and 512. The second area may include at least part of the first area, such as a center of the first area. Aimer-illuminated region 742 may include an image of aimer-pattern 112, FIG. 1.

Circuitry 780 is communicatively coupled to pixel array 740 and operates with pixel array 740 to execute functionality described herein. Circuitry 780 may be part of image sensor 730. Circuitry 780 may be, or include, one of an application-specific integrated circuit and a field-programmable gate array. In embodiments, circuitry 780 includes a processor 786 and a memory 782. Memory 782 may store machine-readable instructions as software 783 that, when executed by the processor, cause optical scanner 700 to execute functionality described herein.

Processor 786 represents any type of circuit or integrated circuit capable of performing logic, control, and input/output operations. For example, processor 786 may include one or more of a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC). Processor 602 may also include a memory controller, bus controller, and other components that manage data flow between processor 786 and memory 782.

Memory 782 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 782 may be integrated into processor 786. Memory 782 stores software 783 that includes non-transitory machine-readable instructions. When executed by processor 786, software 783 causes processor 786 to implement the selected functions of optical scanner 700 as described herein. Software 783 may be firmware or include firmware.

Memory 782 may store at least one of an image-sets **750*s*, 760*s*, and 770*s*. Image-set 750*s* includes an image 750(1), which includes ROI pixel-values 754(1) and non-ROI pixel-values 755(1). Image-set 750***s* may include at least one additional image 750(2–N), where index N≥2, such that images 750 includes a sequence of consecutively captured images. Each image 750(*k*) includes ROI pixel-values 754 (*k*) and non-ROI pixel-values 755(*k*), where index k is less than or equal to N. Herein, a number in parenthesis following a reference number is an instance of the referent of the reference number. For example, each image 750(*k*) is an instance of image 750 of image-set 750*s*.

Each image 750 includes an image region 752(*k*), which may include an image of aimer-pattern 112. In embodiments, the pixel-values of image region 752 are determined in part by signals generated by pixels 742*p* of aimer-illuminated region 742.

Image-set 760*s* includes one or more images 760, which are analogous to images 750. Each image 760 includes ROI pixel-values 764 and non-ROI pixel-values 765, which are analogous to ROI pixel-values 754 and non-ROI pixel-values 755, respectively. An image 760 may include an image region 762, which is analogous to image region 752.

Image-set 770*s* includes one or more images 770, which are analogous to images 750. Each image 770 includes ROI pixel-values 774 and non-ROI pixel-values 775, which are analogous to ROI pixel-values 754 and non-ROI pixel-values 755, respectively. An image 770 may include an image region 772, which is analogous to image region 752.

Memory 782 stores an exposure level 784 and at least one ROI exposure-setting 789, examples of which are exposure settings 789(1-3). In embodiments, software 783 determines exposure level 784 and ROI exposure-setting 789 from at least one of image-sets 750*s*, 760*s*, and 770*s*. The exposure setting of each pixel 742*p* of ROI 744 may equal one of ROI exposure-settings 789. Furthermore, the exposure setting of each pixel 741 of pixel array 740 may equal one of ROI exposure-settings 789. An ROI exposure-setting 789 may include one or both of an exposure duration setting and a gain setting.

Figure 8:
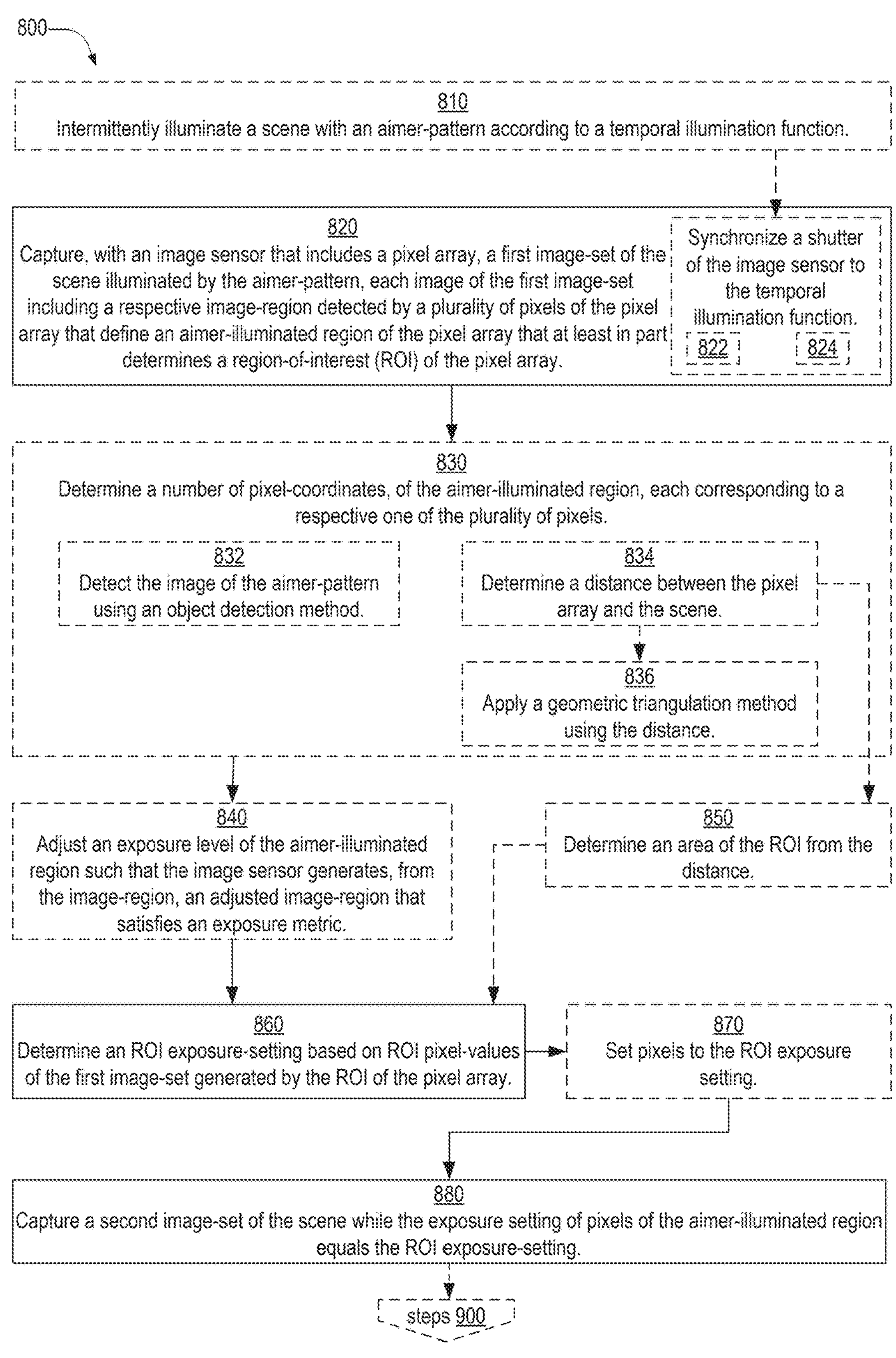
FIG. 8 is a flowchart illustrating an image-acquisition method, which may be implemented by the optical scanner of FIG. 7, in embodiments.

FIG. 8 is a flowchart illustrating an image-acquisition method 800. In embodiments, method 800 is implemented within one or more aspects of optical scanner 700. For example, method 800 may be implemented by processor 786 executing computer-readable instructions of software 783. Method 800 includes at least one of acts 820, 860, and 880. Method 800 may also include one or more of acts 810 and 830.

The following description of method 800 includes parenthetical numbers following terms used in a method act. The parenthetical number indicates that the element associated with the number in parenthesis is an example of the term. For example, the description of act 820 below recites "an image sensor (730)," which means that image sensor 730 of FIG. 7 is an example of the image sensor of method 800.

Act 820 includes capturing, with an image sensor (730) that includes a pixel array (740), a first image-set (750*s*) of a scene (790) illuminated by an aimer-pattern (112). Each image (750) of the first image-set includes a respective image region (752) detected by a plurality of pixels (742*p*) of the pixel array. The plurality of pixels define an aimer-illuminated region (742) of the pixel array that at least in part determines a region-of-interest (ROI 744) of the pixel array.

Method 800 may include an act 810, which precedes act 820. Act 810 includes intermittently illuminating the scene with the aimer-pattern according to a temporal illumination function. When method 800 includes act 810, act 820 may include either act 822 or act 824. Each of act 822 and act 824 includes synchronizing a shutter (732) of the image sensor to the temporal illumination function (787). In act 822, (i) the image sensor captures each image of the first image-set when the aimer-pattern is not illuminating the scene and (ii) no image of the first image-set includes an image of the aimer-pattern. In act 824, (i) the image sensor captures each image of the first image-set when the aimer-pattern is illuminating the scene and (ii) one or more images of the first image-set includes an image of the aimer-pattern Act 830 includes determining a number of pixel-coordinates (742C), of the aimer-illuminated region (742), each corresponding to a respective one of the plurality of pixels (742*p*). Act 830 may precede act 860 and may follow act 820. In embodiments, such as when act 820 includes act 824, one or more respective image-regions (752(*k*)) of an image 750(*k*) includes an image of the aimer-pattern detected by the plurality of pixels (742*p*). In such embodiments, act 830 may include an act 832. Act 832 includes detecting the image of the aimer-pattern using an object detection method.

In embodiments, one or more respective image-regions (752(*k*)) of an image 750(*k*) does not include an image of the aimer-pattern detected by the plurality of pixels (742*p*). In such embodiments, act 830 may include at least one of acts 834 and 836. Act 834 includes determining a distance between the scene (e.g., subject 104 therein) and the image sensor or an additional sensor near the image sensor. The image sensor and the additional sensor, such as a time-of-flight sensor, may be part of scanning system 100 or handheld reader 200. Act 836 includes applying a geometric triangulation method using the distance determined in act 834.

The pixel array of method 800 may be part of an image sensor. In such embodiments, method 800 may include a act 840. Act 840 may precede act 860. Act 840 includes adjusting an exposure level (784) of the aimer-illuminated region (742) such that the image sensor (730) generates, from the aimer-illuminated region, an adjusted image-region that satisfies an exposure metric. The adjusted image-region may replace the image region in one or more images of the first image-set. In embodiments, the exposure metric defines one or more of (i) a maximum number of pixel values exceeding a maximum allowable pixel value and (i) a maximum number of pixel values less than a minimum allowable pixel value.

Method 800 may include act 834 as part of act 830, or independently of act 830. When method 800 includes act 834, method 800 may also include an act 850 of determining an area of the ROI based on the distance determined in act 834.

Act 860 includes determining an ROI exposure-setting (789(1)) based on ROI pixel-values (754) of the first image-set generated by the ROI of the pixel array. In embodiments, the first image-set includes one or more images (750), each of which includes non-ROI pixel-values (755) generated by non-ROI pixels of the pixel array not located within the aimer-illuminated region (742). In such embodiments, determining the ROI exposure-setting (act 860) is based on the ROI pixel-values (754) and is not based on the non-ROI pixel-values (755). In embodiments, the ROI includes a contiguous plurality of pixels, the exposure setting of each pixel of the ROI equals the ROI exposure-setting (789(1)).

Act 870 includes setting each pixel (742*p*) of the ROI to the ROI exposure-setting (789(1)). Act 870 may further include setting each pixel (741) of the pixel array (740) to the ROI exposure-setting.

Act 880 includes capturing a second image-set (760*s*) of the scene while the exposure setting of pixels (742*p*) of the aimer-illuminated region (742) equals the ROI exposure-setting (789(1)). In embodiments, when capturing a second image-set, the exposure setting of each pixel of the pixel array, e.g., all pixels 741, equals the ROI exposure-setting.

Figure 9:
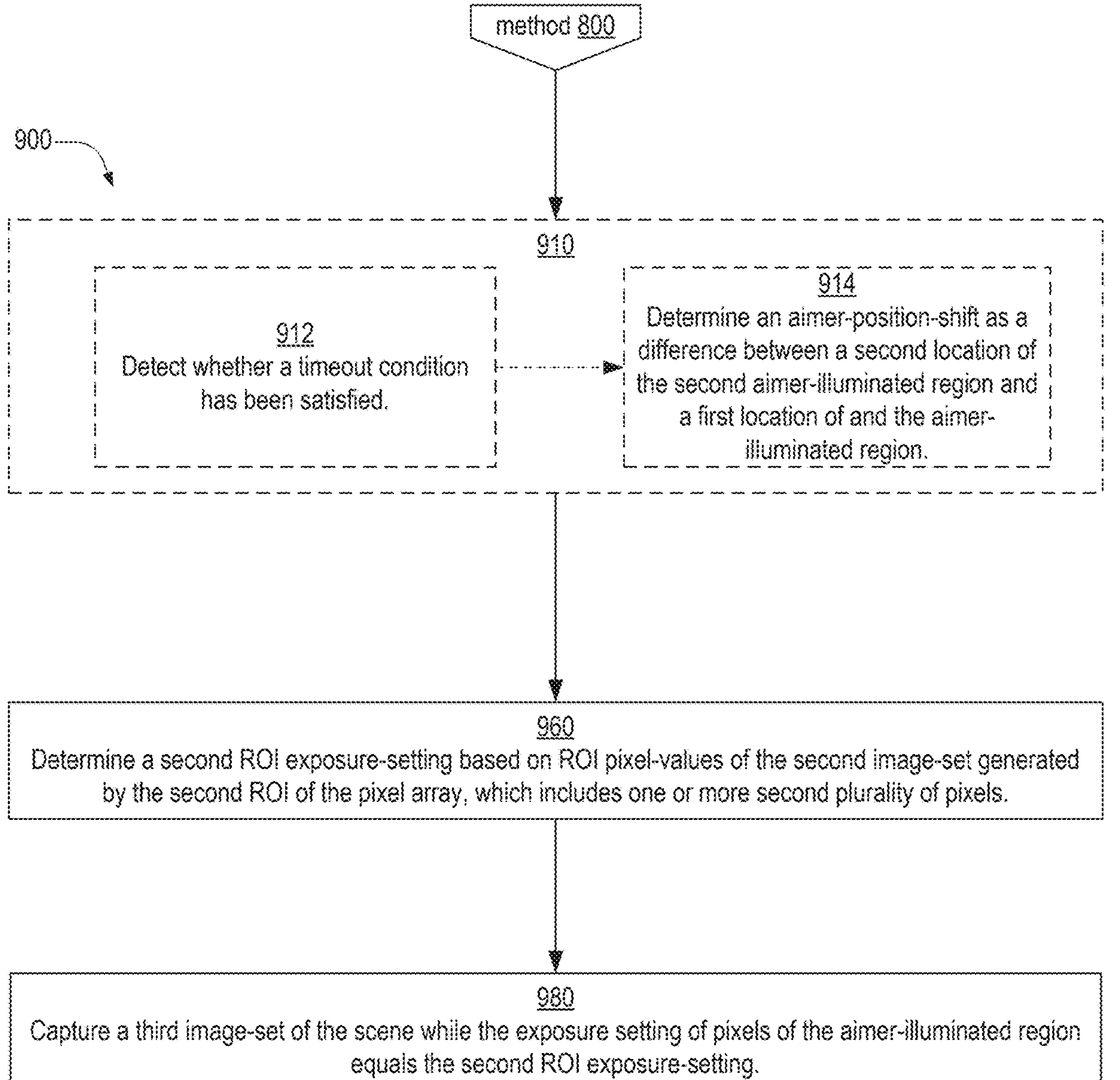
FIG. 9 is a flowchart illustrating method acts that are part of embodiments of the method of FIG. 8.

In embodiments of method 800, each image (760) of the second image-set (760*s*) includes a respective second image region (762) detected by a second plurality of pixels of the pixel array (740) that define a second aimer-illuminated region (742(2)) of the pixel array that at least in part determines a second ROI (744(2)) of the pixel array. In such embodiments, method 800 may include acts 900 shown in FIG. 9. Acts 900 include at least one of acts 910, 960, and 980.

Act 910 includes at least one of act 912 and 914. Act 912 includes detecting whether a timeout condition has been satisfied. The timeout condition may be satisfied after the image sensor captures a predetermined number of images (frames) after completion of act 880. Act 914 includes determining an aimer-position-shift as a difference between a second location of the second aimer-illuminated region (742(2)) and a first location of the aimer-illuminated region (742). In embodiments, act 914 is executed only when the timeout condition of act 912 has been satisfied.

Act 960 includes determining a second ROI exposure-setting (789(2)) based on ROI pixel-values of the second image-set generated by the second ROI (744(2)) of the pixel array, which includes one or more second plurality of pixels. When method 800 includes act 910, act 960 may be executed when one or both of (i) a timeout condition has been satisfied, which may be determined in act 912 and (ii) the aimer-position-shift (determined in act 914) exceeds a threshold value.

In embodiments, each of the ROI exposure-setting and the second ROI exposure-setting including a parameter. The parameter may be exposure time, gain, or a value determined from either or both of exposure time and gain. In such embodiments, act 960 includes implementing an iterative method that uses, as an initial value of the parameter, the value of the parameter in the ROI exposure-setting.

Act 980 includes capturing a third image-set (770*s*) of the scene while the exposure setting of pixels (742*p*) of the aimer-illuminated region equals a third ROI exposure-setting (789(3)). When a timeout condition has been satisfied (912) and/or when the aimer-position-shift (determined in act 914) exceeds the threshold value, the third ROI exposure-setting (789(3)) may equal the second ROI exposure-setting (789(2)). When the aimer-position-shift does not exceed the threshold value, the third ROI exposure-setting (789(3)) may equal the ROI exposure-setting (789(1)).

Features described above, as well as those claimed below, may be combined in various ways without departing from the scope hereof. The following enumerated examples illustrate some possible, non-limiting combinations.

Embodiment 1. An image-acquisition method includes: capturing, with an image sensor that includes a pixel array, a first image-set of a scene illuminated by an aimer-pattern, each image of the first image-set including a respective image-region detected by a plurality of pixels of the pixel array that define an aimer-illuminated region of the pixel array that at least in part determines a region-of-interest (ROI) of the pixel array; determining an ROI exposure-setting based on ROI pixel-values of the first image-set generated by the ROI of the pixel array; and capturing a second image-set of the scene while the exposure setting of pixels of the aimer-illuminated region equals the ROI exposure-setting.

Embodiment 2. The method of embodiment 1, the first image-set including one or more images, each of which includes non-ROI pixel-values generated by non-ROI pixels of the pixel array not located within the aimer-illuminated region, wherein determining the ROI exposure-setting is based on the ROI pixel-values and not based on the non-ROI pixel-values.

Embodiment 3. The method of either one of embodiments 1 or 2, further includes determining a number of pixel-coordinates, of the aimer-illuminated region, each corresponding to a respective one of the plurality of pixels.

Embodiment 4. The method of any one of embodiments 1-3, an image-region of an image of the first image-set including an image of the aimer-pattern detected by the plurality of pixels, wherein determining the number of pixel-coordinates comprises: detecting the image of the aimer-pattern using an object detection method.

Embodiment 5. The method of any one of embodiments 1-4, determining the number of pixel-coordinates includes: determining a distance between the pixel array and the scene; and applying a geometric triangulation method using the distance.

Embodiment 6. The method of any one of embodiments 1-5, further includes: intermittently illuminating the scene with the aimer-pattern according to a temporal illumination function; and capturing the first image-set includes synchronizing a shutter of the image sensor to the temporal illumination function such that (i) the image sensor captures each image of the first image-set when the aimer-pattern is not illuminating the scene and (ii) no image of the first image-set includes an image of the aimer-pattern.

Embodiment 7. The method of any one of embodiments 1-6, the ROI including a contiguous plurality of pixels, the exposure setting of each pixel of the ROI equals the ROI exposure-setting.

Embodiment 8. The method of any one of embodiments 1-7, further includes, before capturing the second image-set, setting each pixel of the ROI to the ROI exposure-setting.

Embodiment 9. The method of any one of embodiments 1-8, further includes, before capturing the second image-set, setting each pixel of the pixel array to the ROI exposure-setting.

Embodiment 10. The method of any one of embodiments 1-9, the pixel array being part of an image sensor, and further includes, before determining the ROI exposure-setting: adjusting an exposure level of the aimer-illuminated region such that the image sensor generates, from the aimer-illuminated region, an adjusted image-region that satisfies an exposure metric.

Embodiment 11. The method of any one of embodiments 1-10, further includes: determining a distance between the pixel array and the scene; and determining an area of the ROI from the distance.

Embodiment 12. The method of any one of embodiments 1-11, the aimer-illuminated region occupying a first area of the pixel array, the ROI occupying a second area of the pixel array that includes the first area.

Embodiment 13. The method of any one of embodiments 1-12, each image of the second image-set including a respective second image region detected by a second plurality of pixels of the pixel array that define a second aimer-illuminated region of the pixel array that at least in part determines a second ROI of the pixel array, the method further includes: determining a second ROI exposure-setting based on ROI pixel-values of the second image-set generated by the second ROI of the pixel array, which includes one or more second plurality of pixels; and capturing a third image-set of the scene while the exposure setting of pixels of the aimer-illuminated region equals the second ROI exposure-setting.

Embodiment 14. The method of any one of embodiments 1-13, each of the ROI exposure-setting and the second ROI exposure-setting including a parameter, the act of determining the second ROI exposure-setting including implementing an iterative method that uses, as an initial value of the parameter, the value of the parameter in the ROI exposure-setting.

Embodiment 15. The method of any one of embodiments 1-14, the initial parameter being exposure time or gain.

Embodiment 16. The method of any one of embodiments 1-15, each image of the second image-set including a respective second image region detected by a second plurality of pixels of the pixel array that define a second aimer-illuminated region of the pixel array that at least in part determines a second ROI of the pixel array, the method further includes: determining an aimer-position-shift as a difference between a second location of the second aimer-illuminated region and a first location of the aimer-illuminated region; when the aimer-position-shift exceeds a threshold value, determining a second ROI exposure-setting based on ROI pixel-values of the second image-set generated by the second ROI of the pixel array, which includes one or more second plurality of pixels; and capturing a third image-set of the scene while the exposure setting of pixels of the aimer-illuminated region equals a third ROI exposure-setting.

Embodiment 17. The method of any one of embodiments 1-16, when the aimer-position-shift exceeds the threshold value, the third ROI exposure-setting equaling the second ROI exposure-setting; and when the aimer-position-shift does not exceed the threshold value, the third ROI exposure-setting equaling the ROI exposure-setting.

Embodiment 18. An optical scanner includes: an image sensor including a pixel array; a light emitter; and circuitry, communicatively coupled to the pixel array, that operates with the pixel array to image a scene illuminated by the light emitter by executing the method of any one of embodiments 1-17.

Embodiment 19. The optical scanner of embodiment 18, the circuitry including: a processor; and a memory storing machine-readable instructions that, when executed by the processor, cause the optical scanner to image the scene by executing the method of any one of embodiments 1-17.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

Regarding instances of the terms "and/or" and "at least one of," for example, in the cases of "A and/or B" and "at least one of A and B," such phrasing encompasses the selection of (i) A only, or (ii) B only, or (iii) both A and B. In the cases of "A, B, and/or C" and "at least one of A, B, and C," such phrasing encompasses the selection of (i) A only, or (ii) B only, or (iii) C only, or (iv) A and B only, or (v) A and C only, or (vi) B and C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

We claim:

1. An image-acquisition method comprising:

capturing, with an image sensor that includes a pixel array, a first image-set of a scene illuminated by an aimer-pattern, each image of the first image-set including a respective image-region detected by a plurality of pixels of the pixel array that define an aimer-illuminated region of the pixel array that at least in part determines a region-of-interest (ROI) of the pixel array;

determining an ROI exposure-setting based on ROI pixel-values of the first image-set generated by the ROI of the pixel array;

capturing a second image-set of the scene while an exposure setting of pixels of the aimer-illuminated region equals the ROI exposure-setting, each image of the second image-set including a respective second image region detected by a second plurality of pixels of the pixel array that define a second aimer-illuminated region of the pixel array that at least in part determines a second ROI of the pixel array;

determining an aimer-position-shift as a difference between a second location of the second aimer-illuminated region and a first location of the aimer-illuminated region;

when the aimer-position-shift exceeds a threshold value, determining a second ROI exposure-setting based on ROI pixel-values of the second image-set generated by the second ROI of the pixel array, which includes one or more second plurality of pixels; and capturing a third image-set of the scene while the exposure setting of pixels of the aimer-illuminated region equals a third ROI exposure-setting.

2. The method of claim 1, the first image-set including one or more images, each of which includes non-ROI pixel-values generated by non-ROI pixels of the pixel array not located within the aimer-illuminated region, wherein determining the ROI exposure-setting is based on the ROI pixel-values and not based on the non-ROI pixel-values.

3. The method of claim 1, further comprising determining a number of pixel-coordinates of the aimer-illuminated region, each corresponding to a respective one of the plurality of pixels, an image-region of an image of the first image-set including an image of the aimer-pattern detected by the plurality of pixels, wherein determining the number of pixel-coordinates comprises:

detecting the image of the aimer-pattern using an object detection method.

4. The method of claim 1, further comprising determining a number of pixel-coordinates of the aimer-illuminated region, each corresponding to a respective one of the plurality of pixels, wherein determining the number of pixel-coordinates comprises:

determining a distance between the pixel array and the scene; and applying a geometric triangulation method using the distance.

5. The method of claim 1, the ROI including a contiguous plurality of pixels, the exposure setting of each pixel of the ROI equals the ROI exposure-setting.

6. The method of claim 1, further comprising, before capturing the second image-set, setting each pixel of the ROI to the ROI exposure-setting.

7. The method of claim 1, further comprising, before capturing the second image-set, setting each pixel of the pixel array to the ROI exposure-setting.

8. The method of claim 1, the pixel array being part of an image sensor, and further comprising, before determining the ROI exposure-setting:

adjusting an exposure level of the aimer-illuminated region such that the image sensor generates, from the aimer-illuminated region, an adjusted image-region that satisfies an exposure metric.

9. The method of claim 1, wherein:

when the aimer-position-shift exceeds the threshold value, the third ROI exposure-setting equaling the second ROI exposure-setting; and when the aimer-position-shift does not exceed the threshold value, the third ROI exposure-setting equaling the ROI exposure-setting.

10. The method of claim 1, further comprising detecting whether a timeout condition has been satisfied, wherein determining the aimer-position-shift is responsive to the timeout condition being satisfied.

11. An image acquisition method of claim 3, comprising:

capturing, with an image sensor that includes a pixel array, a first image-set of a scene illuminated by an aimer-pattern, each image of the first image-set including a respective image-region detected by a plurality of pixels of the pixel array that define an aimer-illuminated region of the pixel array that at least in part determines a region-of-interest (ROI) of the pixel array;

determining an ROI exposure-setting based on ROI pixel-values of the first image-set generated by the ROI of the pixel array;

capturing a second image-set of the scene while an exposure setting of pixels of the aimer-illuminated region equals the ROI exposure-setting;

determining a number of pixel-coordinates of the aimer-illuminated region, each corresponding to a respective one of the plurality of pixels;

intermittently illuminating the scene with the aimer-pattern according to a temporal illumination function; and capturing the first image-set includes synchronizing a shutter of the image sensor to the temporal illumination function such that (i) the image sensor captures each image of the first image-set when the aimer-pattern is not illuminating the scene and (ii) no image of the first image-set includes an image of the aimer-pattern.

12. An image-acquisition method comprising:

capturing, with an image sensor that includes a pixel array, a first image-set of a scene illuminated by an aimer-pattern, each image of the first image-set including a respective image-region detected by a plurality of pixels of the pixel array that define an aimer-illuminated region of the pixel array that at least in part determines a region-of-interest (ROI) of the pixel array;

determining an ROI exposure-setting based on ROI pixel-values of the first image-set generated by the ROI of the pixel array;

capturing a second image-set of the scene while an exposure setting of pixels of the aimer-illuminated region equals the ROI exposure-setting;

determining a distance between the pixel array and the scene; and determining an area of the ROI from the distance.

13. The method of claim 1, the aimer-illuminated region occupying a first area of the pixel array, the ROI occupying a second area of the pixel array that includes the first area.

14. An image-acquisition method comprising:

capturing, with an image sensor that includes a pixel array, a first image-set of a scene illuminated by an aimer-pattern, each image of the first image-set including a respective image-region detected by a plurality of pixels of the pixel array that define an aimer-illuminated region of the pixel array that at least in part determines a region-of-interest (ROI) of the pixel array;

determining an ROI exposure-setting based on ROI pixel-values of the first image-set generated by the ROI of the pixel array;

capturing a second image-set of the scene while an exposure setting of pixels of the aimer-illuminated region equals the ROI exposure-setting, each image of the second image-set including a respective second image region detected by a second plurality of pixels of the pixel array that define a second aimer-illuminated region of the pixel array that at least in part determines a second ROI of the pixel array;

determining a second ROI exposure-setting based on ROI pixel-values of the second image-set generated by the second ROI of the pixel array, which includes one or more second plurality of pixels; and capturing a third image-set of the scene while the exposure setting of pixels of the aimer-illuminated region equals the second ROI exposure-setting.

15. The method of claim 14, each of the ROI exposure-setting and the second ROI exposure-setting including a parameter, the act of determining the second ROI exposure-setting including implementing an iterative method that uses, as an initial value of the parameter, the value of the parameter in the ROI exposure-setting.

16. The method of claim 15, the parameter being exposure time or gain.

17. An optical scanner comprising:

an image sensor including a pixel array;

a light emitter; and circuitry, communicatively coupled to the pixel array, that is configured to operate with the pixel array to image a scene illuminated by the light emitter by:

capturing, with an image sensor that includes a pixel array, a first image-set of a scene illuminated by an aimer-pattern, each image of the first image-set including a respective image-region detected by a plurality of pixels of the pixel array that define an aimer-illuminated region of the pixel array that at least in part determines a region-of-interest (ROI) of the pixel array;

determining an ROI exposure-setting based on ROI pixel-values of the first image-set generated by the ROI of the pixel array; and capturing a second image-set of the scene while an exposure setting of pixels of the aimer-illuminated region equals the ROI exposure-setting, each image of the second image-set including a respective second image region detected by a second plurality of pixels of the pixel array that define a second aimer-illuminated region of the pixel array that at least in part determines a second ROI of the pixel array;

determining a second ROI exposure-setting based on ROI pixel-values of the second image-set generated by the second ROI of the pixel array, which includes one or more second plurality of pixels; and capturing a third image-set of the scene while the exposure setting of pixels of the aimer-illuminated region equals the second ROI exposure-setting.

18. The optical scanner of claim 17, the circuitry being part of the image sensor.

19. The optical scanner of claim 17, the circuitry including:

a processor, and a memory storing machine-readable instructions that, when executed by the processor, cause the optical scanner to image the scene.

20. The optical scanner of claim 17, wherein a third ROI exposure-setting equals the ROI exposure-setting or the second ROI exposure-setting.

* * * * *